A. TURNER.
SPEED RECORDER.
APPLICATION FILED NOV. 20, 1905.
No. 909,482.
Patented Jan. 12, 1909
3 SHEETS—SHEET 1.
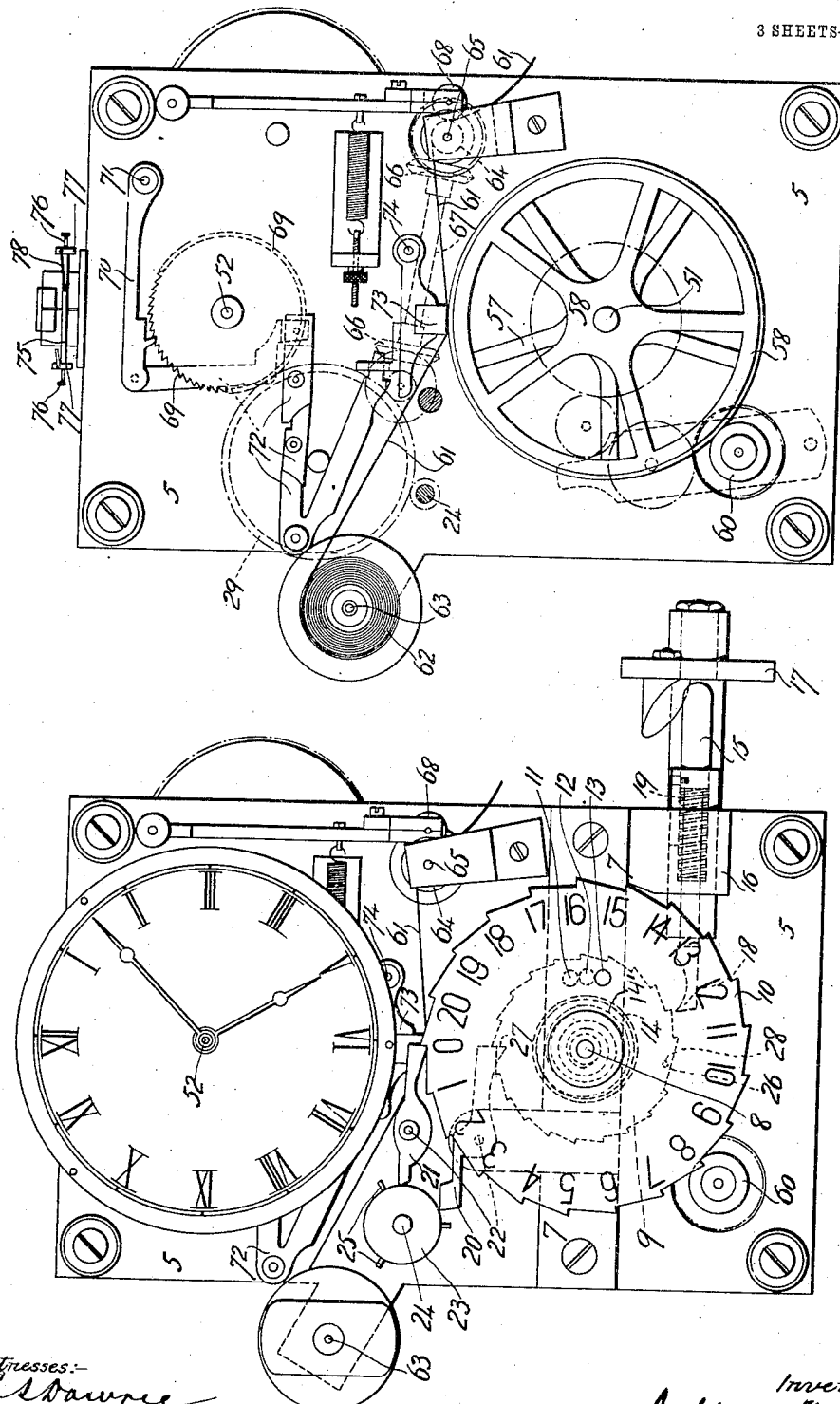
Witnesses:
R S Dawnee
John A. Percival
Inventor:
Archibald Turner
BY
Richards
ATTORNEYS A. TURNER.
SPEED RECORDER.
APPLICATION FILED NOV. 20, 1905.
909,482.
Patented Jan. 12, 1909.
3 SHEETS—SHEET 2.
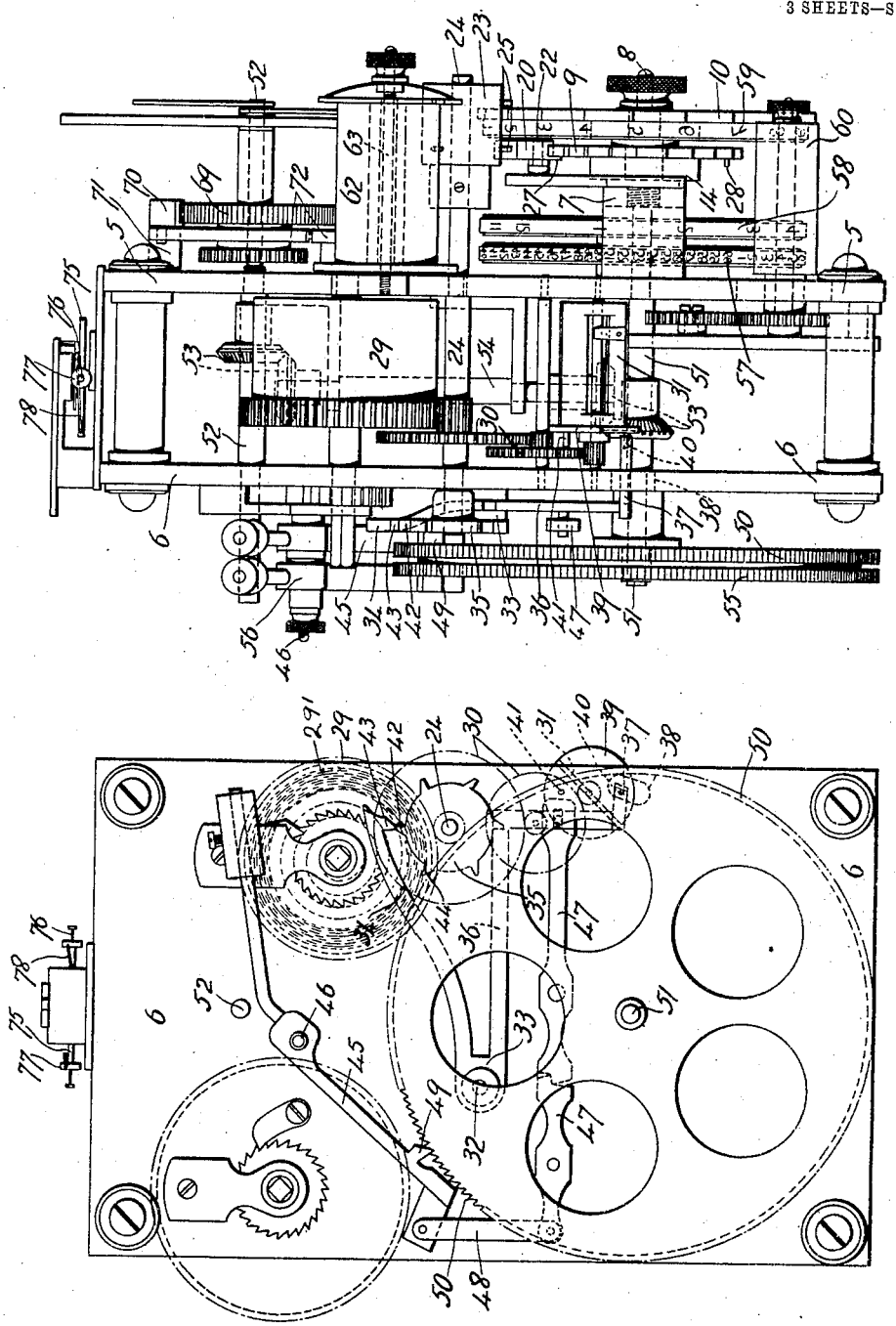
Witnesses:—
Inventor:
Archibald Turner
BY
ATTORNEYS.

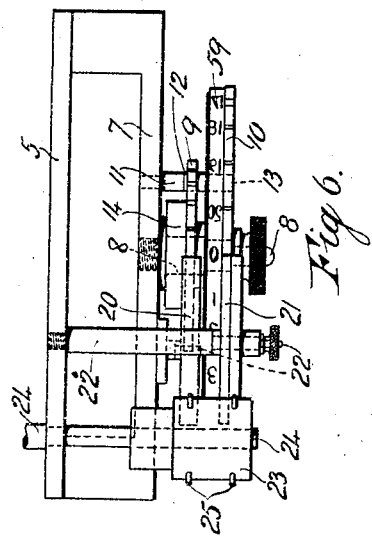
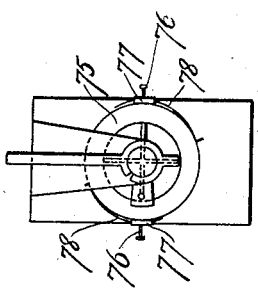
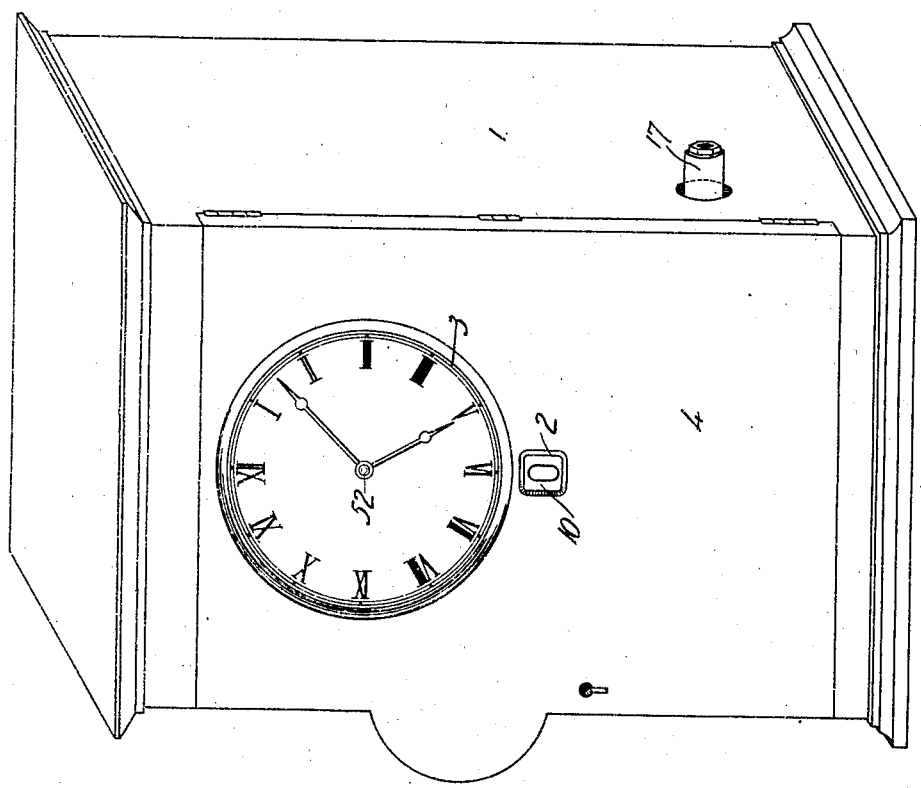

UNITED STATES PATENT OFFICE.

ARCHIBALD TURNER, OF LEICESTER, ENGLAND.

SPEED-RECORDER.

No. 909,482.          Specification of Letters Patent.         Patented Jan. 12, 1909.

Application filed November 20, 1905. Serial No. 288,279.

*To all whom it may concern:*

Be it known that I, ARCHIBALD TURNER, citizen of Leicester, residing at Grange Lane, Leicester, in the county of Leicester, England, have invented certain new and useful Improvements in Speed-Recorders, of which the following is a specification.

This invention has for its main object to produce a recorder specially adapted for use in connection with motor cars and other traveling vehicles.

The recorder comprehended by the present invention is arranged to record at predetermined short intervals the maximum speed at which the vehicle traveled during an immediately preceding period of the same or approximately the same duration.

The invention also comprises mechanism by means of which, not only is the speed of the vehicle registered but also the exact time at which such speed was being traveled, the strip or record upon which both the speed and time are printed may be detached as and when required.

The invention comprises a suitable casing within which the mechanism is inclosed, and the said casing has an opening therein behind which a clock face may be located. A speed dial has marked at regular intervals and in numerical progression around its peripheral face, or circumference the types or numbers, any one of which when marked upon the aforesaid record strip registers the rate at which the vehicle is traveling. The said speed dial is mounted loosely upon a fixed arbor and is connected with a ratchet wheel (also mounted upon the same arbor) so that the latter can move the dial forward, when the said ratchet wheel is driven by a plunger operated directly or indirectly in any suitable manner from the axle, wheel or other moving part of the vehicle. The speed dial and its driver ratchet wheel are each arranged to be returned by spring influence to their starting point, as hereinafter described, at certain predetermined intervals, but at alternate times, the object of which is that the dial shall remain stationary for a certain period, say 18½ seconds, more or less, during which time the type numeral thereon opposite the record strip may register on said strip the maximum rate of speed the vehicle attained during an immediately preceding interval of the same or approximately the same duration. In order to permit these return movements, the detents which prevent back motion of the driving ratchet and the speed dial respectively are alternately released or lifted periodically whereupon the said ratchet wheel, being first free, moves backwards on its arbor under spring influence until a stop or pin thereon arrives in contact with a fixed pin or equivalent on the framing. Likewise the speed dial, when subsequently freed of its detent, returns and comes to rest as soon as a pin thereon meets the pin on the ratchet wheel whether the latter is at zero or starting point or has been advanced again by the plunger. The release alternately of the said detents for the purpose described is as follows:—The detents are carried upon short arbors attached to the framework of the mechanism and may be provided with suitable springs to normally hold them in engagement with the ratchet wheel and dial respectively. Carried on the opposite side of the mechanism is a two armed lever, one arm of which is engaged by a star wheel attached to a spindle carried in the main framework of the mechanism. The other arm is connected with a lever by suitable mechanism and arranged to be operated by a toothed wheel driven by the ordinary mechanism of a clock. As according to the arrangement hereinbefore mentioned the detents, controlling the dial and its driving ratchet respectively, are to be released at certain predetermined regular intervals, the said toothed wheel is driven by the minute arbor of the clock, the teeth of said wheel lifting the two armed lever and allowing the star wheel (which is driven from a separate barrel and spring) to partially rotate so that projecting pins on a drum on the opposite end of the same spindle may engage and lift the detents at the times required.

The invention also includes mechanism for recording the time at which the different rates of speed were traveled by the vehicle. For this purpose two type wheels, having on the periphery thereof the minutes and the hours respectively are mounted on the same arbor as the aforesaid toothed wheel and are arranged so that they register or print on the record strip the actual hour and minutes shown by the clock. These type wheels as well as the types on the dial revolve in contact with an ink roller, or ribbon, and passing over said type wheels is the paper record strip which is drawn off a roll and, after receiving the record, is ultimately wound on another roll provided with suitable gearing receiving its motion from the driving barrel of the detent releasing mechanism. To press the said record strip on to the types, a toothed wheel on the main arbor of the clock operates a lever each time it moves a tooth forward and the said lever through the medium of compound levers raises a pad in the form of a pivoted arm, whereupon a spring draws the said pad suddenly down on to the paper which thereupon presses upon the types and receives the impression therefrom. When the strip is removed from the casing it will show the variations in the speed the vehicle has traveled every 20 seconds (more or less) during its journey and it will also show what speed the vehicle was running at any particular hour or minute of the journey and for what length of time such speed continued, while, as the strip is actuated from the clock mechanism, it will also indicate at what period of the journey, if any, the vehicle was at rest.

This invention will however be more clearly understood from the following further description with reference to the accompanying sheets of drawings, in which:—

Figure 1, is a front elevation of the mechanism, removed from the case. Fig. 2, is an elevation of the mechanism, as shown in Fig. 1, the clock face and speed dial being removed to show the recording mechanism and type wheels. Fig. 3, is an elevation of the back of the mechanism, showing the means for releasing the detents of the speed dial and its driving ratchet respectively. Fig. 4, is a side elevation of the mechanism looking from the left of Figs. 1 and 2, and from the right of Fig. 3. Fig. 5, is a perspective view of the outside of the case. Fig. 6, is a plan of the speed dial and its connected parts. Fig. 7, is a plan of the balance wheel of the clock mechanism. Fig. 5 is drawn to a smaller scale than the remaining figures, and the same reference characters are employed to designate like parts throughout the drawings.

The invention as shown in Fig. 5, comprises mainly a casing 1, wherein the mechanism is contained, the front of the casing being provided with an opening 3 behind which the clock face may be seen. A door 4 or similar means may be provided for removing the record strip when desirable. The mechanism, when removed from the casing 1, comprises mainly frame plates 5 and 6 (Figs. 1 to 4) between which the clock and other gear, driving barrels, and wheel trains are carried, and on the outer faces of which plates the mechanism for speed and time recording, and releasing the detents respectively, is attached. Referring to Figs. 1, 4 and 6 the plate 5 of the frame has attached thereto a bridge or bar 7 provided in the center with a fixed arbor 8 having loosely mounted thereon a ratchet wheel 9 and speed dial 10. The bridge 7 is also provided with a projecting stop 11 (Fig. 1) against which a pin 12 on the ratchet wheel 9 makes contact, and a pin 13 on the dial 10 is adapted to engage the said pin 12 so that the backward movements of both dial and ratchet wheel are checked by the stop 11. When in the position as shown in Fig. 1 the dial and ratchet wheel are both at zero, or starting point, and suitable springs 14' contained within the barrels 14 are attached to the arbor 8 to always return the said dial and ratchet wheel to zero (when free of their detents) after having been advanced as hereinafter described.

The speed dial 10 is furnished at regular intervals and in numerical progression around a flange on its rear face, with types, any one of which when uppermost or opposite the record strip registers the rate of speed as hereinafter described.

The ratchet wheel 9 is driven forward by means of a plunger 15 carried in a block 16 on the plate 5, and operated by means of a cam 17 rotated through the medium of intermediate mechanism as hereinafter described from the wheel or axle of the vehicle. As the said cam rotates, the plunger 15 is pushed forward and a pawl 18 on the end thereof engages one of the teeth of the ratchet wheel 9 and advances the said wheel one tooth round, the length of movement of the plunger being arranged to effect this result. The plunger is returned under the influence of a spring 19 and it will be understood that for each forward stroke of the said plunger the ratchet wheel will be advanced one tooth. By reason of the engagement of the pin 12 with the pin 13 on the dial, the latter will also be intermittently advanced with the forward movement of the ratchet wheel, and in order to prevent the latter and the dial 10 returning to zero until required, detents 20 and 21 are provided to engage the said ratchet wheel and dial respectively as shown in Figs. 1 and 6, the dial being furnished at the periphery with teeth to correspond with the ratchet wheel. The said detents are carried on arbors 22 fixed in the framework and suitable springs (not shown) may be provided to keep them in engagement with the teeth on the ratchet wheel and dial.

It will be understood that, when the vehicle is traveling, the ratchet wheel 9 is being constantly advanced a tooth at a time by the plunger 15, and in order to record the varying maximum speed (that is, miles per hour) at which the vehicle is traveling, it is necessary that the said ratchet wheel and the dial should be returned to zero or starting point at certain regular intervals, say every 20 seconds, which period is found in practice to be most convenient. This return movement is obtained by lifting the detents 20 and 21 at the end of every 20 seconds when the ratchet wheel and dial being free will be returned under the influence of the springs before mentioned. It is also necessary that the ratchet wheel and dial should be returned at alternate times in order that the dial may remain stationary under the record strip for a certain period approximately 18½ seconds. This alternate lifting of the detents 20 and 21 for the purpose mentioned is carried out by means of a drum 23 attached to a spindle 24, the said drum having projecting pins 25 which, as the spindle 24 revolves, alternately engage the ends of the detents and lift same. The alternate releasing of the ratchet wheel and dial as just described gives the following result. The dial 10 is intermittently advanced by the ratchet wheel 9 until the latter is released and returns to zero, the dial meanwhile being held stationary in its advanced or forward position, by the detent 21. During the time the dial is thus at rest, the ratchet wheel 9 is being again moved forward by the plunger 15 and when the said dial is released it immediately returns until its pin 13 comes into contact with the pin 12 on the ratchet wheel, whereupon the dial 10 will be again advanced until the ratchet wheel is released when the dial will remain stationary and record on the strip the maximum speed at which the vehicle traveled during the immediately preceding 20 seconds. The type numbers on the speed dial 10 do not advance higher than 20 and in order that the said ratchet wheel and dial may be free from engagement with the plunger 15 and therefore not actuated by the latter should the speed of the vehicle exceed the limit of 20 miles per hour, the last tooth on the ratchet wheel 9 is omitted, as shown at 26, Fig. 1 so that when the ratchet wheel has made a complete revolution the moving plunger will run free and not actuate the ratchet and dial. To prevent back motion of the ratchet wheel 9, when the space 26 comes round to the detent 20, a lip 27 on the side of the latter engages a pin 28 on the back of the ratchet wheel, see Figs. 1 and 4.

In order that a quick lifting and falling movement may be imparted to the detents 20 and 21 the drum 23 and spindle 24 are intermittently rotated, each movement being equal to ⅙th of a revolution and 6 movements taking place per minute thus giving an alternate lift to each detent at successive regular intervals of 20 seconds. This intermittent rotary movement is imparted to the drum 23 by the following mechanism shown in Figs. 3 and 4. The spindle 24 is driven directly from a separate driving barrel 29 and main spring 29' adapted to be wound up in the usual way, and connected to the spindle by means of a train of wheels 30, is a "fly" or fan 31 for steadying the speed of the said spindle 24. Carried on a short arbor 32 on the plate 6 is a two armed lever 33 the upper arm 34 being shaped to engage a star wheel 35 attached to the end of the spindle 24, the lower arm 36 being provided with a projecting finger 37 passing through an opening 38 in the plate 6 of the frame. Attached to the "fly" spindle is a disk 39 furnished on its outer face with projecting pins 40 and 41 adapted to engage the finger 37, and when in the normal position as shown in Fig. 3 the "fly" 31 is prevented from rotation by reason of the pin 40 coming into contact with the finger 37. When the lever 33 is lifted the finger 37 will rise clear of the pin 40 and allow the "fly" to rotate half a revolution, when the pin 41 will come into contact with the raised finger 37 and again stop the movement, the half revolution of the "fly" 31 however is sufficient to allow the tooth 42 of the star wheel 35 to move clear of the end 43 of the arm 34 so that when the lever 33 is dropped again, the finger 37 will fall lower and clear of the pins 40 and 41 and the mechanism will be free to rotate until the next tooth 44 on the rotating star wheel causes the end 43 to ride up it and thus lift the finger 37 into the path of the pin 40 when the movement will stop until the lever 33 is again lifted. The star wheel 35 is furnished with 6 teeth so that 6 intermittent movements of the spindle 24 per revolution may result. In order to impart the necessary rise and fall to the lever 33 at regular intervals, for the purpose just described, a lever 45 carried on an arbor 46 on the plate 6 is connected to the lower arm 36 of the lever 33 by a series of compound levers 47 and link 48. A tooth 49 on the under face of the said lever 45 engages a ratchet wheel 50 attached to an arbor 51 driven from the main minute arbor of the clock by miter wheels 53 and a vertical spindle 54 (see Fig. 4). As the teeth of the ratchet wheel 50 move forward, the lever 45 will be first gradually lifted allowing the half revolution of the "fly" 31, and when the tooth 49 drops off the teeth of the ratchet wheel the spindle 24 will be partly rotated as previously described. The arbor 51 is driven at the same speed as the main minute arbor of the clock and the ratchet wheel 50 having 180 teeth imparts a movement to the lever 33, 3 times per minute. In order to give the alternate lifts to the said lever 33 (6 lifts per minute being necessary) a second ratchet wheel 55 and lever 56 are provided (Fig. 4) the ratchet wheel being fixed on the same arbor 51 as the ratchet wheel 50 and the lever 56 also being carried on the arbor 46. A second link (not shown) connects the lever 56 with the compound levers 47, the ratchet wheel 55 being set and fixed so that the teeth of the latter are located midway between the teeth of the ratchet wheel 50. By this arrangement the lift of the lever 33 is obtained, thus releasing the shaft 24, six times during the minute. The wheel 55 and lever 56 are removed from Fig. 3, for the sake of clearness. The mechanism for registering or printing the variations in the speed and the time at which such speed was traveled is illustrated principally in Figs. 2 and 4 and is carried on the plate 5 of the frame.

The minute arbor 51, before mentioned is provided at the front end thereof with type wheels 57 and 58 the wheel 57 having on its periphery type for printing or registering the hours, and the wheel 58 being provided with figures for printing the minutes. The wheel 58 is fixed to the arbor 51 and the wheel 57 being mounted loosely on the same is geared down to revolve in unison with, and register the same hour as indicated by the clock. A flange 59 Fig. 6 on the back of the speed dial 10 is also provided with types representing miles per hour, and all the type wheels revolve in contact with an ink roller 60. Passing over the top of the type wheels is a paper record strip 61 which is drawn off a feed roll 62 carried on a spindle 63 attached to the plate 5, and the said strip after receiving the record is passed over another roller 64. The said roller 64 is fixed upon an arbor 65 and is driven from the separate driving barrel 29 through the medium of the miter gear wheels 66 and spindle 67, and a roller 68 constantly held in contact with the strip 61 presses same against the roller 64 so that the strip will be fed forward when the latter roller revolves. To press the said record strip on to the types the main minute arbor 52 of the clock is furnished with a ratchet wheel 69 which operates a lever 70 each time it moves a tooth forward, and the said lever 70 being pivoted on an arbor 71 on the frame, raises, through the medium of the compound levers 72, a pad 73 pivoted on a fixed arbor 74. As the lever 70 falls, the pad 73 is suddenly drawn down either by its own weight or by spring influence (not shown) and in dropping presses the paper strip 61 upon the types said strip receiving the impression therefrom. As previously described the driving barrel 29 is intermittently rotated and consequently an intermittent movement of the roller 64 and strip 61 will also take place, the movement of the pad 73 being so timed that the pressure of the strip on to the types only takes place when the said strip is at rest. Further the recording mechanism just described is also arranged and timed with relation to the speed dial 10 so that the movement of the former takes place only at such times as the dial is stationary, i. e., during the period of rest when the type numeral which is uppermost or nearest to the record strip represents the speed and marks the same upon the strip. The ratchet wheel 69 has 60 teeth so that a registration or impression takes place once per minute, but it will be obvious that by varying the number of teeth in the said wheel the registration may be made to take place with greater or less frequency as desirable.

The type of clock mechanism most adaptable for the purpose of this invention is that type provided with the well known form of balance wheel escapement. In the mechanism illustrated in the drawings the ordinary clock mechanism of the same is employed to drive several of the other parts of the invention and as the driven load varies at intervals it is found that at such period as the load is light the escapement gear is caused to "race" or travel too fast the result being that the time keeping of the clock is irregular and damage to the escapement is likely to accrue. To obviate this disadvantage a special form of balance wheel is provided as illustrated in Fig. 7 where the wheel 75 has at opposite points on its periphery pins 76 on which small weights 77 are free to slide. The said weights 77 are normally held inwards by springs 78 attached at one end to the balance wheel and at the opposite end pass through holes in the weights, Figs. 2, 3 and 4. It will be quite obvious that when the balance wheel 75 revolves above a certain speed the weights 77 under centrifugal force will slide outwards on the pins 76 and consequently govern the speed of the wheel 75 and keep the same normal.

According to the arrangement of mechanism herein described the speed dial 10 is moved round, to the varying speed, three times per minute, and has a period of rest each time of approximately 18½ seconds, (the other 1½ seconds being absorbed in each advance movement of said dial) and it will be obvious that such period may be varied and the dial arranged to operate with greater or less frequency by providing the operating ratchet wheels 50 and 55 with a greater or less number of teeth, but at the same time it will be understood that the driven cam 17 is always geared down to the proper ratio with the number of movements per minute of the dial. The cam 17 may be connected with, and driven from the wheel or axle of the vehicle in any convenient manner such for example as a flexible shaft connected direct to the said cam and at the opposite end to any suitable gearing, which any mechanic can readily devise, connected to the wheel or any moving part of the vehicle.

Any ordinary cyclometer may (if desirable) be attached to the machine for showing the total mileage traveled and such cyclometer may be geared up to an extra type wheel (not shown) mounted loosely on the arbor 51 so that the mileage traveled is also periodically registered upon the record strip.

What I claim then is:—

1. A speed recorder comprising a carrier arranged to periodically determine the maximum speed attained by a vehicle, type figures on the said carrier to represent the speed e. g. miles per hour, two wheels marked with type figures to represent hours and minutes respectively, and clock mechanism including the hands and means for moving the said two wheels in unison with the hands of the clock, and means for taking a record of both the speed indicated by the carrier and the time indicated by the clock from said type wheels.

2. A speed recorder comprising a carrier arranged to periodically indicate the maximum speed attained by a vehicle, type figures on said carrier to represent speed units, two wheels marked with type figures to represent hours and minutes respectively, and clock mechanism including the hands and means for moving the said two wheels in unison with the hands of the clock, and a pad operable by the clock mechanism so as to be periodically moved into and out of contact with the type wheels and means coöperating with the pad for taking a record of both the speed indicated by the carrier and the time indicated by the clock from the type wheels.

3. A speed recorder comprising a dial having type thereon and a stop, a ratchet wheel having a stop thereon engaging with the stop on the dial, means operated by the movement of the vehicle for giving the ratchet wheel a step by step movement, springs for returning the dial and ratchet wheel back to normal position, detents engaging with the dial and ratchet wheel to hold them in their advanced positions, a drum having teeth thereon engaging with the detents to release the same from the dial and ratchet wheel, a spring drum for rotating said drum, a governor for said drum, a clockwork, means controlled by said clockwork and engaging with the governor for giving the drum an intermitting movement, two wheels carrying type to represent hours and minutes respectively, means for moving said wheels in unison with the hands of the clock, and means for taking a record of both the speed indicated by the dial and the time indicated by the clock from said type wheels.

4. A speed recorder comprising a dial having type thereon and a stop, a ratchet wheel having a stop thereon engaging with the stop on the dial, means operated by the movement of the vehicle for giving the ratchet wheel a step by step movement, springs for returning the dial and ratchet wheel back to normal position, detents engaging with the dial and ratchet wheel to hold them in their advanced positions, a drum having teeth thereon engaging with the detents to release the same from the dial and ratchet wheel, a spring drum for rotating said drum, a governor for said drum, a clockwork, means controlled by said clockwork and engaging with the governor for giving the drum an intermitting movement, two wheels carrying type to represent hours and minutes respectively, means for moving said wheels in unison with the hands of the clock, means for taking a record of both the speed indicated by the dial and the time indicated by the clock from said type wheels, said means comprising means for intermittingly feeding a paper strip over the type, said feeding means being operated by the spring drum, a pad adapted to press the paper strip onto the type, and means operated from the minute hand arbor of the clock for alternately raising and lowering said pad.

In testimony whereof I have affixed my signature in presence of two witnesses.

ARCHIBALD TURNER.

Witnesses:
E. H. LEWIS,
WALTER W. BALL.